(12) United States Patent
Takahashi et al.

(10) Patent No.: US 10,008,970 B2
(45) Date of Patent: Jun. 26, 2018

(54) CONTROL APPARATUS FOR AC MOTOR

(71) Applicant: DENSO CORPORATION, Kariya, Aichi-pref. (JP)

(72) Inventors: Hidekazu Takahashi, Kariya (JP); Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/485,580

(22) Filed: Apr. 12, 2017

(65) Prior Publication Data

US 2017/0294863 A1 Oct. 12, 2017

(30) Foreign Application Priority Data

Apr. 12, 2016 (JP) .................. 2016-079534

(51) Int. Cl.
*H02P 21/00* (2016.01)
*H02P 7/00* (2016.01)
*H02P 27/08* (2006.01)
*H02P 21/22* (2016.01)
*H02P 21/20* (2016.01)
*H02P 25/098* (2016.01)

(52) U.S. Cl.
CPC .............. *H02P 27/08* (2013.01); *H02P 21/20* (2016.02); *H02P 21/22* (2016.02); *H02P 25/098* (2016.02)

(58) Field of Classification Search
None
See application file for complete search history.

(56) References Cited

U.S. PATENT DOCUMENTS

| 2006/0076914 A1* | 4/2006 | Yaguchi ................ H02P 25/098 |
| | | 318/432 |
| 2015/0333681 A1 | 11/2015 | Matsuki et al. |
| 2017/0294862 A1 | 10/2017 | Takahashi |

FOREIGN PATENT DOCUMENTS

| JP | 2014-158328 A | 8/2014 |
| JP | 5779862 B2 | 9/2015 |
| JP | 2017-192198 A | 10/2017 |

\* cited by examiner

*Primary Examiner* — Bentsu Ro
*Assistant Examiner* — Zemenay Truneh
(74) *Attorney, Agent, or Firm* — Oliff PLC

(57) ABSTRACT

A control apparatus for an AC motor includes an inverter, a voltage-command calculation unit calculating a vector used for giving a command to the inverter, a voltage-waveform specifying unit specifying, as a voltage waveform for operating the inverter based on the vector, a pulse pattern selected from previously stored voltage waveforms, or a voltage waveform of a PWM signal generated by a comparison between a phase voltage and a carrier wave, an amplitude-spectrum extraction unit obtaining a bus current of the inverter to extract an amplitude spectrum of a specific frequency corresponding to a resonance frequency of a circuit through which the bus current flows, and a voltage-amplitude limiting unit limiting an amplitude of the vector so that the amplitude spectrum of the specific frequency becomes less than a threshold, if the amplitude spectrum of the specific frequency correlating with the voltage waveform is the threshold or more.

8 Claims, 19 Drawing Sheets

PHASE VOLTAGE WAVEFORM

BUS CURRENT SPECTRUM (FFT)

VOLTAGE AMPLITUDE CHANGE RATE LIMITING/SMOOTHING

VOLTAGE PHASE CHANGE RATE LIMITING/SMOOTHING

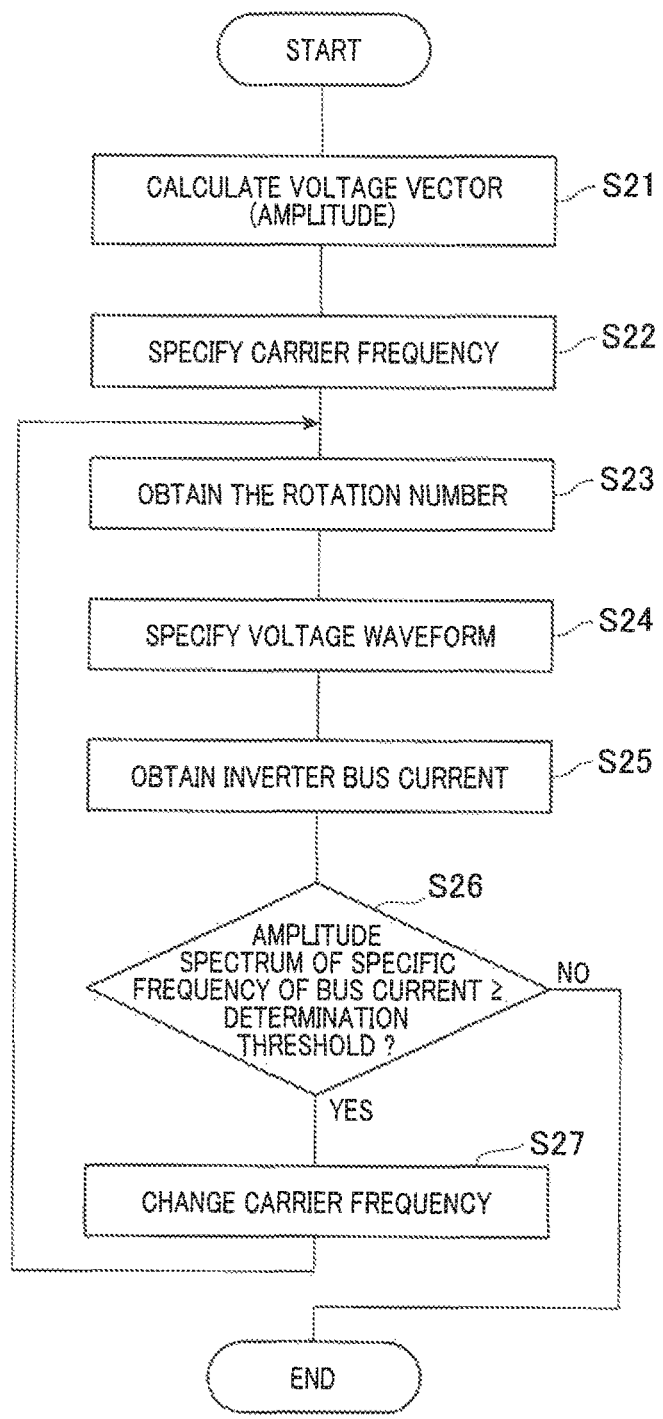

CONTROL APPARATUS FOR AC MOTOR

CROSS-REFERENCE TO RELATED APPLICATION

This application is based on and claims the benefit of priority from earlier Japanese Patent Application No. 2016-79534 filed Apr. 12, 2016, the description of which is incorporated herein by reference.

BACKGROUND

Technical Field

The present invention relates to a control apparatus for an AC motor that calculates a voltage vector used for giving a command to an inverter and controls energization of the AC motor.

Related Art

Conventionally, there has been known a technique for controlling a controlled variable of an AC motor with high accuracy in a control apparatus that sets an amplitude (or a norm) of an output voltage vector of an inverter using required torque and rotational speed for the AC motor as inputs.

For example, in the control apparatus for a rotary machine disclosed in Japanese Patent No. 5779862, a basic norm setting means sets a basic norm of an output voltage vector of a power conversion circuit using a parameter concerning torque of the rotary machine and rotational speed of the rotary machine as inputs. A correction means calculates a correction amount of the basic norm as an operation amount for feedback control of a d-axis current flowing through the rotary machine, and corrects the basic norm by the correction amount.

In addition, in the control apparatus for a rotary machine disclosed in Japanese Patent Application Laid-Open No. 2015-220884, a phase setting means sets a voltage phase $\phi$ based on a deviation so between command torque and estimated torque calculated from an actual current. An amplitude setting means sets an amplitude operation amount $\Delta V$ by using a coordinate axis from which change in the voltage phase $\phi$ has been decoupled in a dq coordinate system.

In a circuit including a power supply, an inverter, and an AC motor of an AC motor drive system, resonance is generated due to inductance components and capacitive components of a relay, a reactor, a capacitor, the AC motor, and the like. In a case where a specific frequency of an amplitude spectrum of an inverter bus current matches a resonance frequency of the circuit according to an output voltage waveform of the inverter, noise and vibration of the system increase. However, Japanese Patent No. 5779862 and Japanese Patent Application Laid-Open No. 2015-220884 do not mention anything about this problem.

SUMMARY

An embodiment provides a control apparatus for an AC motor that suppresses noise and vibration due to resonance caused when a specific frequency of an amplitude spectrum of an inverter bus current matches a resonance frequency of a circuit.

As a first aspect of the embodiment, a control apparatus for an AC motor includes: an inverter that converts DC power received from a power supply to AC power by operations of a plurality of switching elements to supply the AC power to the AC motor; a voltage command calculation unit that calculates a voltage vector used for giving a command to the inverter; a voltage waveform specifying unit that specifies, as a voltage waveform for operating the inverter based on the voltage vector calculated by the voltage command calculation unit, a pulse pattern selected from a plurality of previously stored voltage waveforms depending on a predetermined condition, or a voltage waveform of a PWM signal generated by a comparison between a phase voltage and a carrier wave; an amplitude spectrum extraction unit that obtains a bus current of the inverter to extract an amplitude spectrum of a specific frequency corresponding to a resonance frequency of a circuit through which the bus current flows; and a voltage amplitude limiting unit that limits an amplitude of the voltage vector so that the amplitude spectrum of the specific frequency becomes less than a determination threshold, if the amplitude spectrum of the specific frequency correlating with the voltage waveform is the determination threshold or more.

BRIEF DESCRIPTION OF THE DRAWINGS

In the accompanying drawings:

FIG. 17 is a flowchart of a carrier frequency changing process according to the fifth embodiment;

DETAILED DESCRIPTION OF THE PREFERRED EMBODIMENTS

Figure 1:
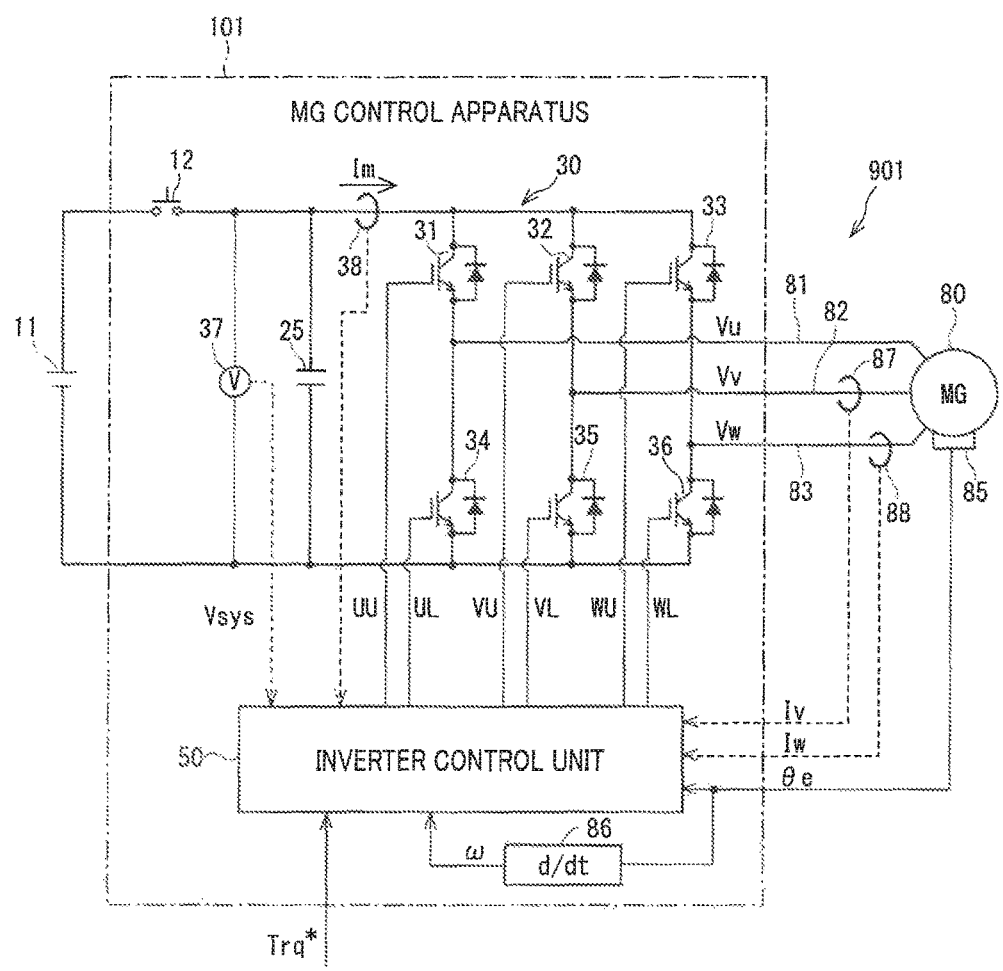
FIG. 1 is a schematic configuration diagram of an MG drive system to which control apparatuses for an AC motor of first to sixth embodiments are applied.

Hereinafter, a plurality of embodiments of a control apparatus for an AC motor will be described with reference to the drawings. Substantially the same configurations in the plurality of embodiments will be denoted by the same reference numerals, and descriptions thereof will be omitted. In addition, the following first to seventh embodiments are collectively referred to as "the present embodiment".

A control apparatus for an AC motor of the present embodiment is an apparatus that controls energization of a motor generator (hereinafter referred to as "MG") which is a three-phase AC motor, in a system (AC motor drive system) that drives the MG serving as a power source of a hybrid vehicle or an electric vehicle. The "MG" and an "MG control apparatus" of each embodiment correspond to an "AC motor" and a "control apparatus for an AC motor".

First Embodiment

[System Configuration]

First, an overall configuration of an MG drive system to which MG control apparatuses of first to sixth embodiments are applied will be described with reference to FIG. 1. FIG. 1 illustrates a system including one MG.

An MG drive system 901 is a system that converts DC power of a battery 11 as a "power supply" which is a chargeable/dischargeable secondary battery into three-phase AC power by an inverter 30 and supplies the power to an MG 80.

In the MG drive system 901, an MG control apparatus 101 mainly includes the inverter 30 and an inverter control unit 50. It should be noted that the MG control apparatus 101 can be similarly applied to an MG drive system including two or more MGs.

The MG 80 is, for example, a permanent magnet synchronous three-phase AC motor. In the present embodiment, the MG 80 has both a function as an electric motor that generates torque that drives driving wheels of a hybrid vehicle and a function as a generator that recovers energy of torque transmitted from an engine and the driving wheels by energy generation.

In a current path connected to two-phase windings of three-phase windings 81, 82, and 83 of the MG 80, a current sensor that detects a phase current is provided. In an example shown in FIG. 1, current sensors 87 and 88 that detect phase currents Iv and Iw are provided in current paths connected to a V-phase winding 82 and a W-phase winding 83, respectively, and a remaining U-phase current Iu is estimated based on Kirchhoff's law. In other embodiments, currents of any two phases may be detected, and currents of three phases may be detected. Alternatively, a technique of estimating currents of other two phases based on a current detection value of one phase may be adopted.

An electrical angle θe of the MG 80 is detected by a rotation angle sensor 85 such as a resolver, for example.

In the inverter 30, six switching elements 31 to 36 of upper and lower arms are bridge-connected. Specifically, the switching elements 31, 32, and 33 are U-phase, V-phase, and W-phase upper arm switching elements, and switching elements 34, 35, and 36 are U-phase, V-phase, and W-phase lower arm switching elements, respectively. The switching elements 31 to 36 are configured by, for example, IGBTs, and freewheel diodes which allow current flowing from a low potential side to a high potential side are connected in parallel with the switching elements 31 to 36.

The inverter 30 converts DC power into three-phase AC power by operation of the switching elements 31 to 36 according to gate signals UU, UL, VU, VL, WU, and WL from the inverter control unit 50. The inverter 30 then applies phase voltages Vu, Vv, and Vw corresponding to a voltage command calculated by the inverter control unit 50 to the phase windings 81, 82, and 83 of the MG 80, respectively. A smoothing capacitor 25 smoothes a system voltage Vsys input to the inverter 30. The system voltage Vsys corresponds to an "inverter voltage".

A voltage sensor 37 detects the system voltage Vsys. A current sensor 38 detects a bus current Im of the inverter 30. It should be noted that, in other embodiments, the current sensor 38 may not be provided, and the bus current Im may be calculated by other methods or the like which will be described later.

The inverter control unit 50 is configured by a microcomputer and the like, and includes therein a CPU, a ROM, an I/O, which are not shown, a bus line that connects these components, and the like. The microcomputer executes control by software processing by executing a previously stored program by the CPU and hardware processing by a dedicated electronic circuit.

The inverter control unit 50 obtains the system voltage Vsys, the bus current Im, the two-phase phase currents Iv and Iw, and the electrical angle θe detected by sensors. The inverter control unit 50 so also obtains electrical angular velocity ω [deg/s] obtained by time-differentiating the electrical angle θe by a differentiator 86. Herein, since the electrical angular velocity ω is converted into the rotation number N [rpm] by multiplying a constant of proportionality, the "rotation number obtained by converting the electric angular velocity ω" is omitted and referred to as the "rotation number ω". It should be noted that the differentiator 86 may be provided inside the inverter control unit 50.

Further, the inverter control unit 50 receives a torque command Trq* from a host control circuit.

Based on these pieces of information, the inverter control unit 50 calculates the gate signals UU, UL, VU, VL, WU, and WL for operating the inverter 30. The inverter 30 convers DC power input from the battery 11 into AC power and supplies the AC power to the MG 80 by operation of the switching elements 31 to 36 according to the gate signals UU, UL, VU, VL, WU, and WL.

Figure 2A:
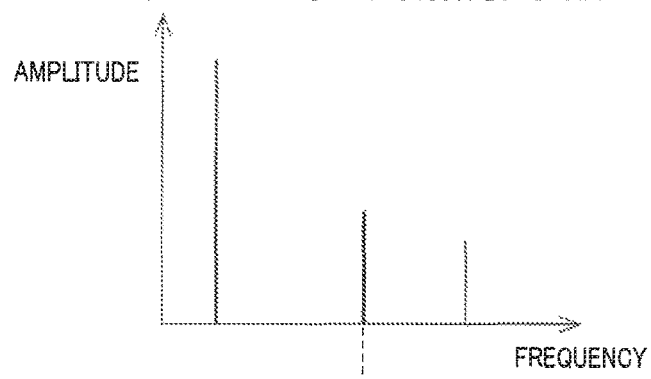
FIG. 2A is a spectrum diagram of an inverter bus current.

In the MG control apparatus 101 having such a configuration, as illustrated in FIG. 2A, the bus current Im of the inverter 30 has a frequency distribution of an amplitude spectrum correlated with a voltage waveform.

Figure 2B:
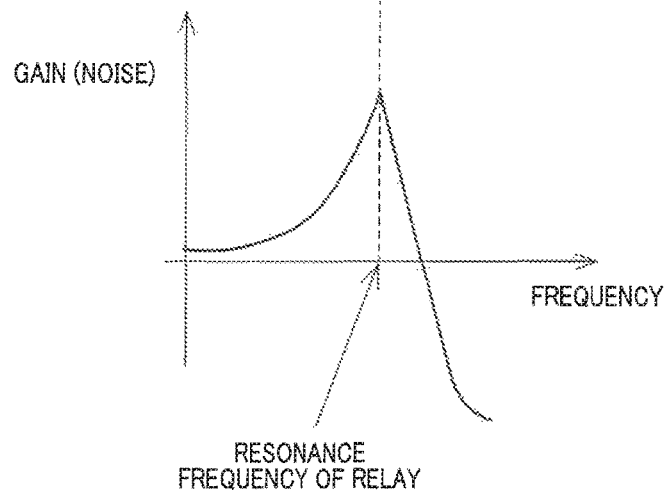
FIG. 2B is a diagram illustrating a resonance frequency of a relay.

In addition, a relay 12 capable of shutting off power supply from the battery 11 is provided at an input portion of the inverter 30. Incidentally, in the MG drive system 901, elements having inductance components and capacitive components such as the relay 12, the capacitor 25, and motor windings 81 to 83 exist in a "circuit including the battery 11, the inverter 30 and the MG 80". These elements generate resonance during driving of the inverter 30. Accordingly, as illustrated in FIG. 2B, frequency characteristics of the circuit peaks at a resonance frequency of the relay 12, for example.

Therefore, in a case where a specific frequency of an amplitude spectrum of the bus current Im of the inverter 30 matches a resonance frequency of the relay 12 or the like of the circuit, vibration and noise due to resonance may increase. For example, in the MG control apparatus 101 applied to a hybrid vehicle, vibration and noise of a vehicle may affect merchantability and drivability.

The present embodiment includes a configuration of the inverter control unit 50 for suppressing such resonance. Hereinafter, the configuration of the inverter control unit 50 will be described in detail.

[Configuration and Operation of Inverter Control Unit]

Configurations and operations of the inverter control unit 50 will be described with reference to FIGS. 3A to 10.

Figure 3:
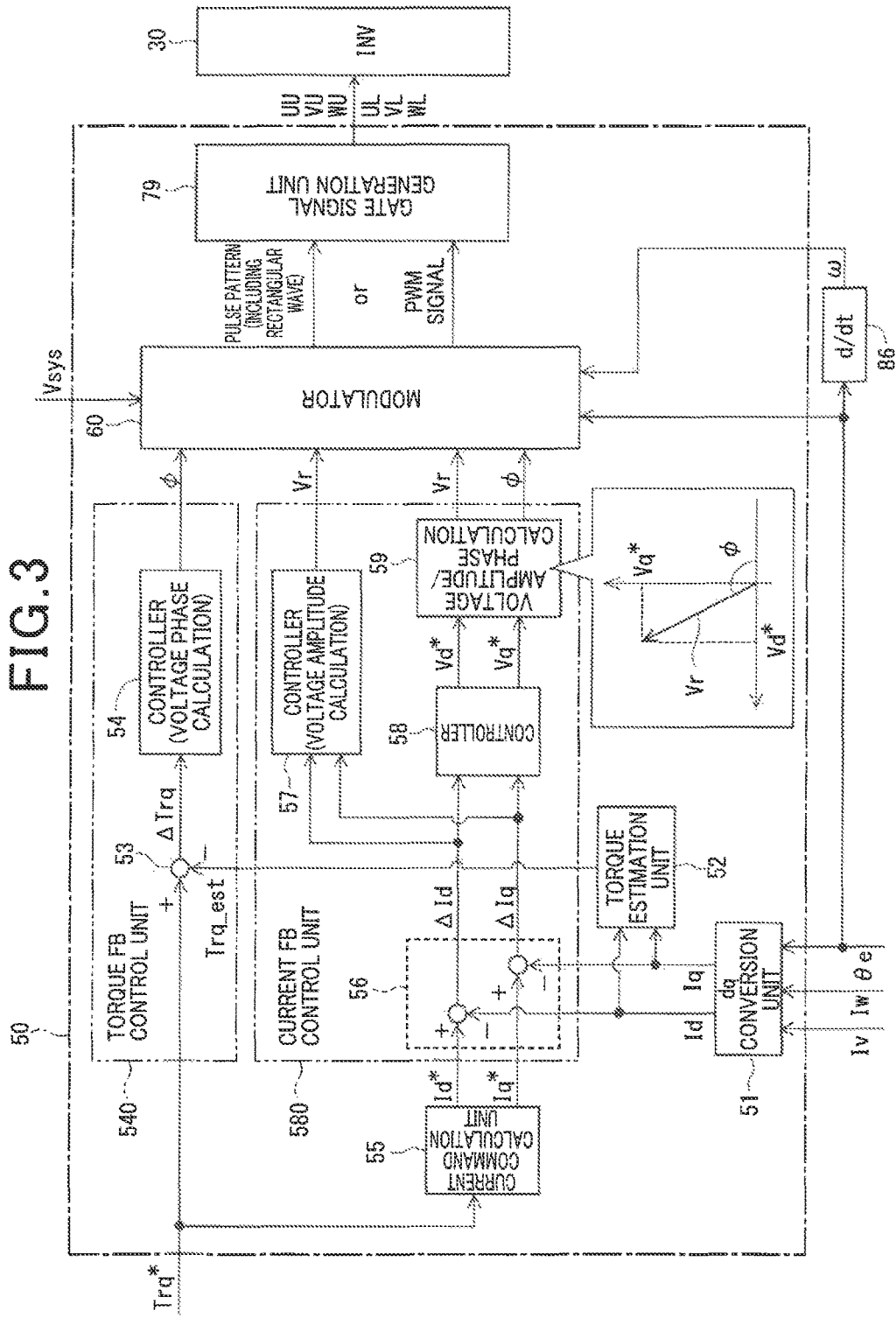
FIG. 3 is a control block diagram of an inverter control unit of each embodiment.

As illustrated in FIG. 3, the inverter control unit 50 includes a dq conversion unit 51, a torque estimation unit 52, a torque subtracter 53, a controller 54, a current command calculation unit 55, a current subtracter 56, a controller 57, a controller 58, a voltage amplitude/phase calculation unit 59, a modulator 60, a gate signal generation unit 79, and the like. Among these, the controller 57, the controller 58, and the voltage amplitude/phase calculation unit 59 may be selectively provided according to the configuration of a feedback control unit ("FB control unit" in the drawing).

Here, a torque feedback control unit 540 and a current feedback control unit 580 function as a "voltage command calculation unit" that calculates a voltage vector used for giving a command to the inverter 30. A "voltage vector" in the following description basically means a "voltage command vector".

The dq conversion unit 51 converts phase currents obtained from the current sensors 87 and 88 into dq-axis currents Id and Iq based on the electrical angle θe and feeds them back to the current subtracter 56.

Based on the dq-axis currents Id, Iq and a motor constant of the MG 80, the torque estimation unit 52 calculates a torque estimation value Trq_est by using Formula (1). It should be noted that, in a system including a torque sensor in the MG 80, the torque estimation unit 52 may not be provided and a torque detection value may be obtained.

$$Trq\_est = p \times \{Iq \times \psi + (Ld - Lq) \times Id \times Iq\} \quad (1)$$

In the formula,

P: the number of pole pairs of MG

ψ: counter electromotive voltage constant

Ld and Lq: d-axis inductance and q-axis inductance.

The torque feedback control unit 540 includes the torque subtracter 53 and the controller 54.

The torque subtracter 53 calculates a torque deviation ΔTrq between the torque command Trq* and the torque estimation value Trq_est. The controller 54 calculates a voltage phase φ by PI calculation so as to converge the torque deviation ΔTrq to zero and outputs the calculated voltage phase φ to the modulator 60. In this manner, the torque feedback control unit 540 calculates the phase φ of the voltage vector as an operation amount for feedback-controlling the torque of the MG 80.

Based on the torque command Trq*, the current command calculation unit 55 calculates dq-axis current commands Id* and Iq* using a map or a mathematical formula, so as to obtain maximum torque per current, for example.

In a configuration in which the inverter control unit 50 includes the torque feedback control unit 540, the current feedback control unit 580 includes the current subtracter 56 and the controller 57.

The current subtracter 56 calculates current deviations ΔId and ΔIq between the dq-axis current commands Id* and Iq* and the dq-axis currents Id and Iq fed back from the dq conversion unit 51. The controller 57 calculates voltage amplitude Vr by the PI calculation so as to converge the current deviations ΔId and ΔIq to zero and outputs the calculated voltage amplitude Vr to the modulator 60. In this manner, the current feedback control unit 580 calculates the amplitude Vr of the voltage vector as an operation amount for feedback-controlling the current flowing through the MG 80.

Therefore, in a case where the torque feedback control unit 540 and the current feedback control unit 580 cooperate to configure the "voltage command calculation unit", the voltage phase φ calculated by the controller 54 of the torque feedback control unit 540 and the voltage amplitude Vr calculated by the controller 57 of the current feedback control unit 580 are output to the modulator 60.

In addition, the inverter control unit 50 may not include the torque feedback control unit 540, and only the current feedback control unit 580 may configure the "voltage command calculation unit". In this configuration, the current feedback control unit 580 includes the current subtracter 56, the controller 58, and the voltage amplitude/phase calculation unit 59.

The controller 58 calculates dq-axis voltage commands Vd* and Vq* by the PI calculation so as to converge the current deviations ΔId and ΔIq to zero. The voltage amplitude/phase calculation unit 59 converts the dq-axis voltage commands Vd* and Vq* into the voltage amplitude Vr and the voltage phase φ, and outputs the voltage amplitude Vr and the voltage phase φ to a modulator 601. It should be noted that, although the voltage phase φ is illustrated based on a d axis in FIG. 3, the voltage phase φ may be defined based on a q axis.

The modulator 60 receives, in addition to the voltage amplitude Vr and the voltage phase φ, information such as the system voltage Vsys, the electrical angle θe, and the rotation number ω. Based on these pieces of information, the modulator 60 outputs a pulse pattern or a PWM signal as an output waveform of a pulse voltage for operating the inverter 30.

In the following description of the modulator 60 in each embodiment, a three-digit number starting from "60" is given as a reference sign of each modulator, with the embodiment number assigned to the third digit of the three-digit number for distinction.

Figure 4:
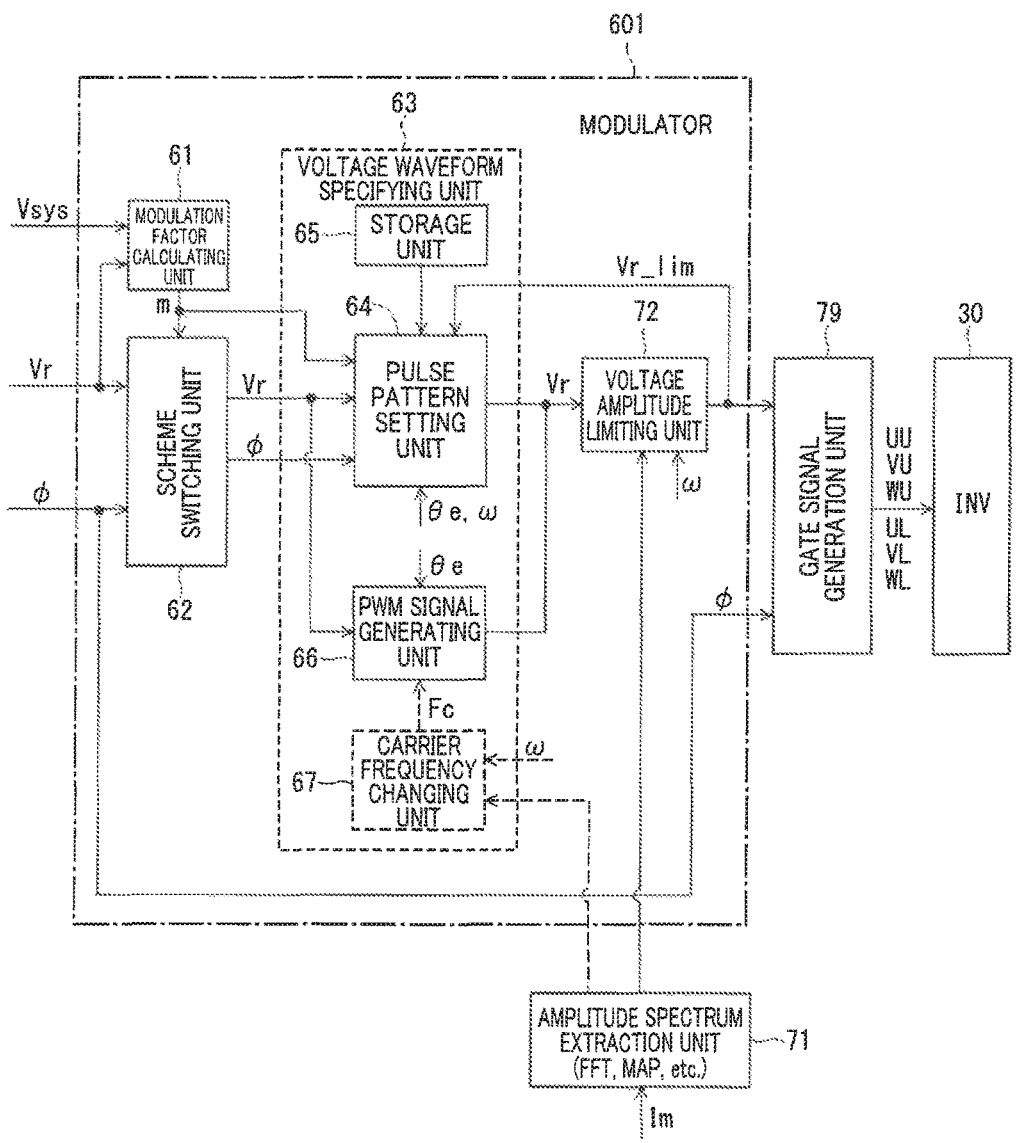
FIG. 4 is a control block diagram of modulators of the first to fourth embodiments.

As illustrated in FIG. 4, the modulator 601 of the first embodiment includes a modulation factor calculating unit 61, a scheme switching unit 62, a voltage waveform specifying unit 63, and a voltage amplitude limiting unit 72 as a characteristic configuration of the first embodiment. The voltage waveform specifying unit 63 includes a pulse pattern setting unit 64, a storage unit 65, and a PWM signal generating unit 66. It should be noted that a carrier frequency changing unit 67 described in a fifth embodiment may not be included in the first embodiment, and is therefore indicated by a broken line.

The modulation factor calculating unit 61 calculates a modulation factor m by Formula (2) based on the voltage amplitude Vr output from the current feedback control unit 580 and the system voltage Vsys.

$$m = 2\sqrt{(2/3)} \times (Vr/Vsys) \quad (2)$$

The scheme switching unit 62 switches a specifying method for a voltage waveform by the voltage waveform specifying unit 63 based on the modulation factor m and the like.

Figure 5A:
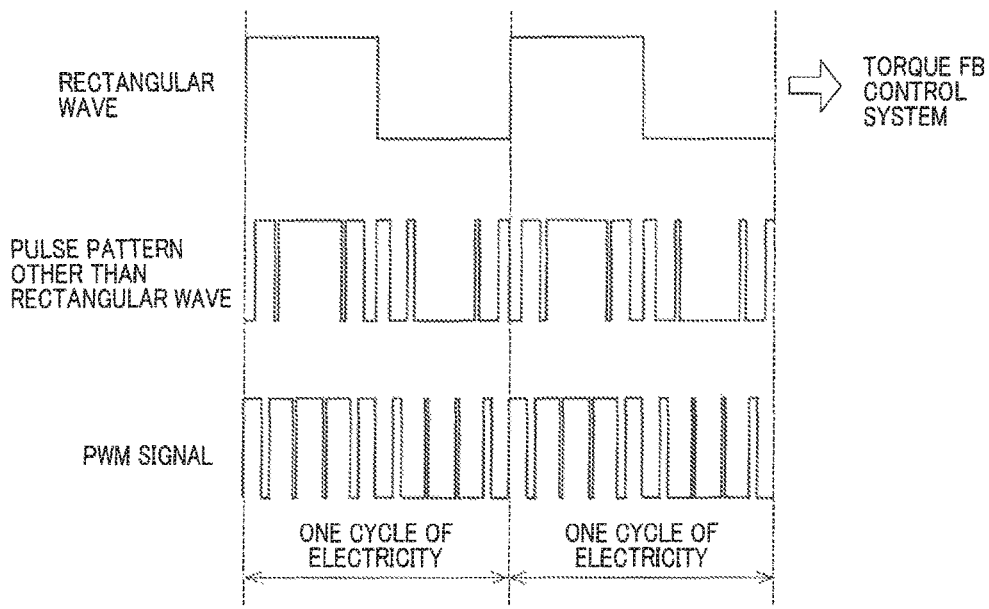
FIG. 5A is a diagram illustrating an example of a waveform of a phase voltage.

Here, FIG. 5A is referred to for an example of the voltage waveform.

The pulse pattern is a voltage waveform selected by the pulse pattern setting unit 64 according to the modulation factor m, the rotation number ω, and the like from a plurality of voltage waveforms previously stored in the storage unit 65.

Herein, the pulse pattern includes a pattern in which a rectangular wave of (having) one pulse is output per one cycle of electricity (per one electrical cycle). Since the modulation factor m of the rectangular wave is fixed at 1.27, in rectangular wave control, the voltage amplitude Vr is constant and only the voltage phase φ is operated. In a case where the rectangular wave control is performed for the three-phase AC motor, a ratio of order components of the sixth order of an electric cycle and of a multiple of 6 included in the phase voltage and the phase current increases.

The pulse pattern other than the rectangular wave is defined by the number of pulses of one cycle of electricity, a position and a width of each pulse according to the modulation factor m, the rotation number ω and the like.

The PWM signal is generated in the PWM signal generating unit 66 by comparing a carrier wave and the phase voltage calculated based on an output of the current feedback control unit 580. Specifically, duty converted from the phase voltage is compared with the carrier wave.

The voltage waveform specifying unit 63 has at least one of the pulse pattern setting unit 64 and the PWM signal generating unit 66.

When the modulation factor is less than 1.27, the scheme switching unit 62 selects the PWM signal or the pulse pattern other than the rectangular wave as a specifying method of the voltage waveform. In a case of the PWM signal, a sinusoidal wave PWM is used when the modulation factor is in the range of 0 to 1.15, and overmodulation PWM is used when the modulation factor is in the range of 1.15 to 1.27.

In addition, the scheme switching unit 62 selects the rectangular wave when the modulation factor is 1.27. Accordingly, the inverter control unit 50 stops the control by the current feedback control unit 580 when the voltage waveform specified by the voltage waveform specifying unit 63 becomes a rectangular wave, and calculates a voltage vector by the torque feedback control unit 540.

The voltage amplitude limiting unit 72 limits the voltage amplitude Vr when a predetermined condition to be described later is satisfied. The pulse pattern setting unit 64 resets the pulse pattern based on limited voltage amplitude Vr_lim. The voltage amplitude Vr determined to be unnecessary to be limited is output to the gate signal generation unit 79. In addition, the voltage phase φ is separately output to the gate signal generation unit 79.

The gate signal generation unit 79 generates the gate signals UU, UL, VU, VL, WU, and WL based on the voltage amplitude Vr and the voltage phase φ output from the modulator 60, and outputs the gate signals to the switching elements 31 to 36 of the inverter 30.

Next, an amplitude spectrum extraction unit 71 obtains the bus current Im of the inverter 30 and extracts the amplitude spectrum of the specific frequency of the bus current Im by a fast Fourier transform ("FFT" in the drawing), a map, or the like.

Figure 5B:
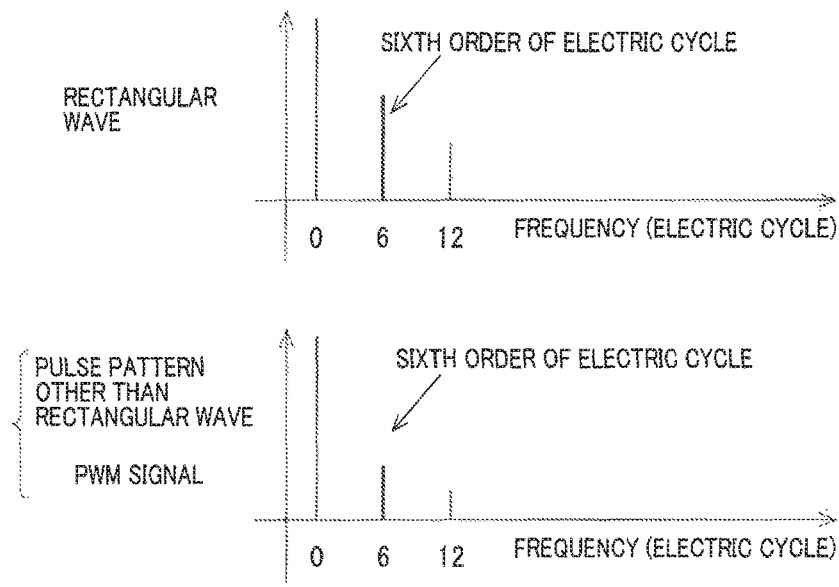
FIG. 5B is a spectrum diagram of an inverter bus current obtained when a phase voltage is applied to a motor.

As described above, distribution of the amplitude spectrum of the bus current Im of the inverter 30 varies depending on the output voltage waveform specified by the voltage waveform specifying unit 63. Referring to FIG. 5B, in a case where a rectangular wave is output by torque feedback control, for example, the amplitude spectrum of the sixth order of the electric cycle increases compared with a case where the pulse pattern other than the rectangular wave or the PWM signal is output.

In this case, assuming that the frequency of the sixth order of the electric cycle converted by the rotation number ω is the "specific frequency", when the specific frequency matches the resonance frequency of the relay 12 or the like of the circuit, vibration and noise due to resonance may increase.

Therefore, when the amplitude spectrum of the specific frequency is equal to or larger than the determination threshold, the voltage amplitude limiting unit 72 limits the voltage amplitude Vr so that the amplitude spectrum of the specific frequency is less than the determination threshold value.

Here, the amplitude spectrum of the bus current Im can be calculated by the following method or the like.

[1] The bus current Im is calculated by sequentially subjecting the bus current Im to a fast Fourier Transform. The bus current Im may be calculated by dividing a product of the phase current detection value or a command value and the phase voltage by the inverter voltage, other than be detected by the current sensor 38.

Figure 6:
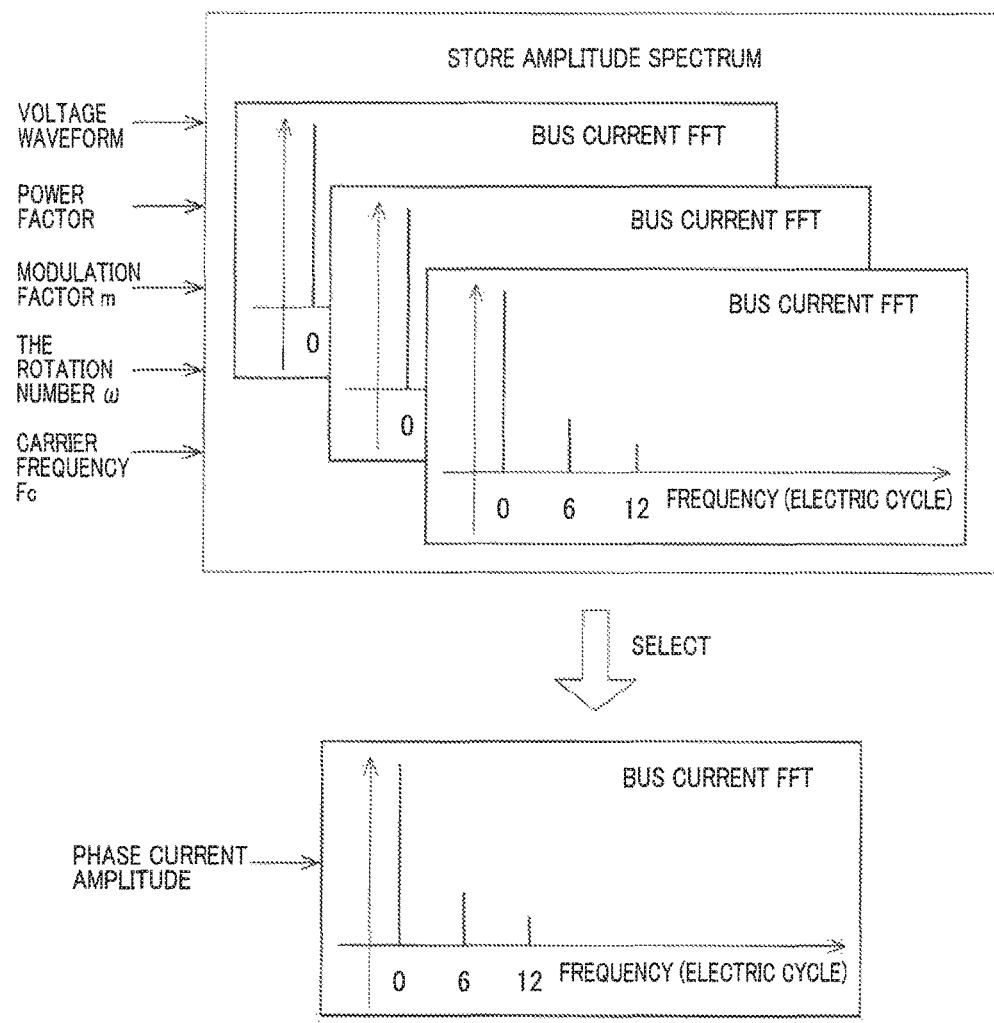
FIG. 6 is a diagram illustrating an example of a method of calculating an amplitude spectrum.

[2] As illustrated in FIG. 6, the amplitude spectrum of the bus current Im spectrally analyzed in advance is stored for each of a power factor and a modulation factor, an appropriate spectrum is selected according to the voltage waveform, the power factor, the modulation factor m, the rotation number ω, and a carrier frequency Fc, and the amplitude is corrected with phase current amplitude.

[3] The frequency of the amplitude spectrum of the bus current Im can be specified based on the voltage waveform, the rotation number ω of the MG 80, and the carrier frequency Fc. In addition, the amplitude of the spectrum can be specified by the modulation factor m and the power factor in a case where the amplitude is normalized with current amplitude. Therefore, the spectrum amplitude may be changed for each rotation number ω depending on whether or not a spectrum frequency is in the vicinity of the resonance frequency.

The determination threshold for the amplitude spectrum of the specific frequency is preferably set as follows so that noise and vibration caused by matching between the specific frequency and the resonance frequency fall below a predetermined level.

[1] The determination threshold is set so that fluctuation of the system voltage Vsys is suppressed to be equal to or lower than a predetermined limit value.

Figure 7:
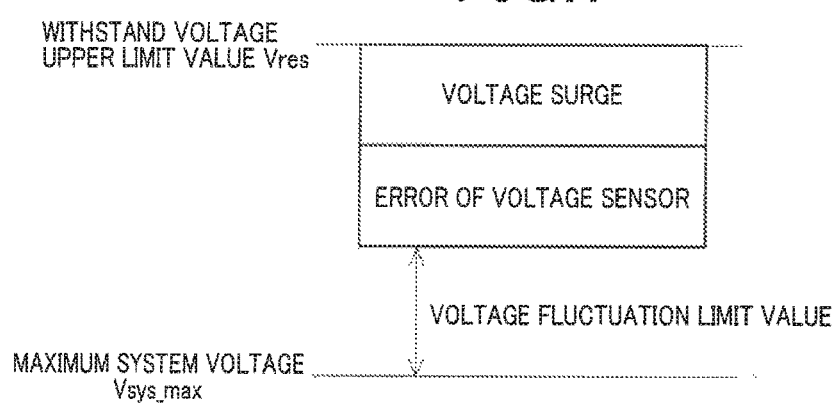
FIG. 7 is a diagram illustrating an example of a method of setting a determination threshold of the amplitude spectrum.

For example, as illustrated in FIG. 7, a value is obtained by subtracting a voltage surge amount due to a switching operation of the switching elements 31 to 36 and a detection error of the voltage sensor 37 from the difference between a withstand voltage upper limit value Vres and the maximum system voltage Vsys_max, and the value is set as a voltage fluctuation limit value.

[2] The determination threshold is set so that fluctuation in a power supply current is suppressed to be a predetermined value or lower. The predetermined value is defined by a degradation characteristics of the battery 11 by a current fluctuation frequency and current fluctuation amplitude.

[3] With the amplitude spectrum of the electric sixth-order component of the rectangular wave as a reference value, the reference value itself or a value equivalent to 50% of the reference value or the like may be used as the determination threshold, for example.

Figure 8:
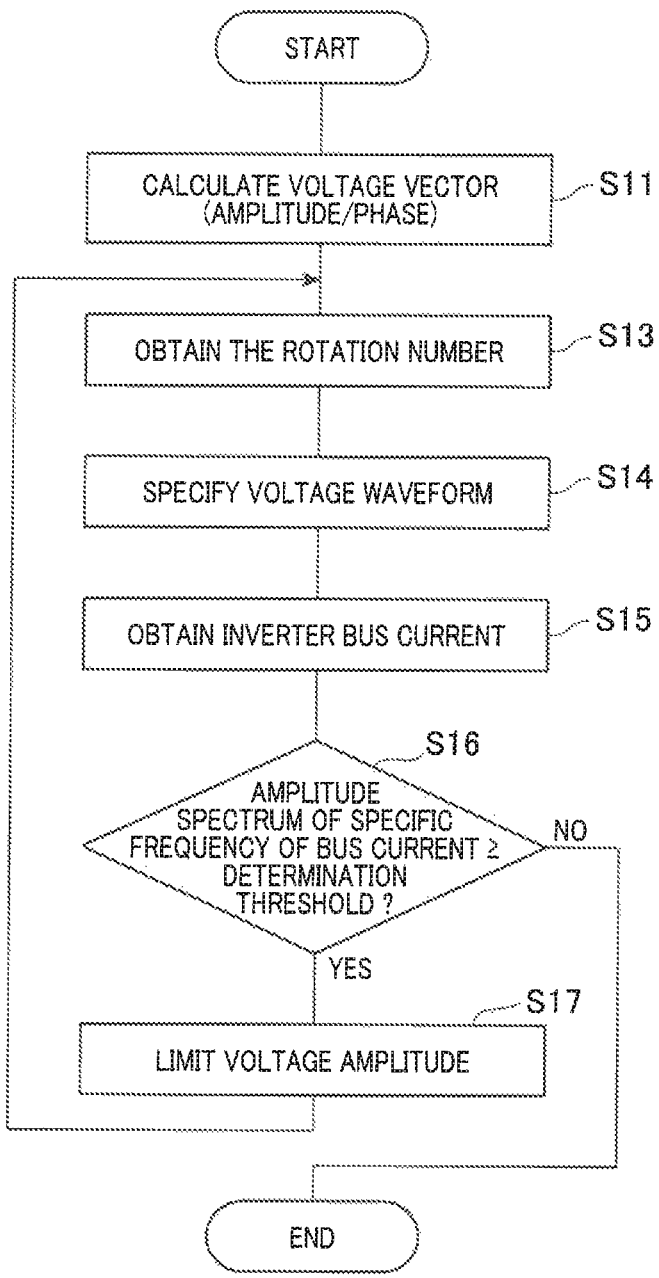
FIG. 8 is a flowchart of a voltage amplitude limiting process according to the first embodiment.

Next, a flowchart of a voltage amplitude limiting process is illustrated in FIG. 8. In the following description of the flowchart, a symbol "S" means a step. It should be noted that, in order to make the second digit of step numbers correspond to those in FIG. 17 to be described later, S12 is missing. In addition, a control subject of each step in the flowchart is the inverter control unit 50.

In S11, the current feedback control unit 580 calculates the voltage amplitude Vr, and the torque feedback control unit 540 calculates the voltage phase φ to calculate the voltage vector.

In S13, the rotation number ω is obtained.

In S14, the voltage waveform specifying unit 63 specifies the voltage waveform.

In S15, the amplitude spectrum extraction unit 71 obtains the bus current Im.

In S16, it is determined whether or not the amplitude spectrum of the specific frequency extracted by the amplitude spectrum extraction unit 71 is equal to or larger than the determination threshold. In the case of NO in S16, the routine ends.

In the case of YES in S16, the voltage amplitude limiting unit 72 limits the voltage amplitude Vr in S17. The process then returns to S13, in which the voltage waveform is specified again, and S14-S16 are repeated.

As a result, when it is determined as NO in S16, the limitation of the voltage amplitude is released.

As described above, in the MG control apparatus 101 of the first embodiment, when the specific frequency of the amplitude spectrum of the bus current Im of the inverter 30 matches the resonance frequency of the circuit and the amplitude spectrum of the specific frequency is equal to or larger than the determination threshold, the voltage amplitude limiting unit 72 limits the voltage amplitude Vr. This makes it possible to appropriately suppress noise and vibration of the system. Particularly, in an application to a hybrid vehicle, it is possible to avoid an influence on merchantability and drivability.

Figure 9:
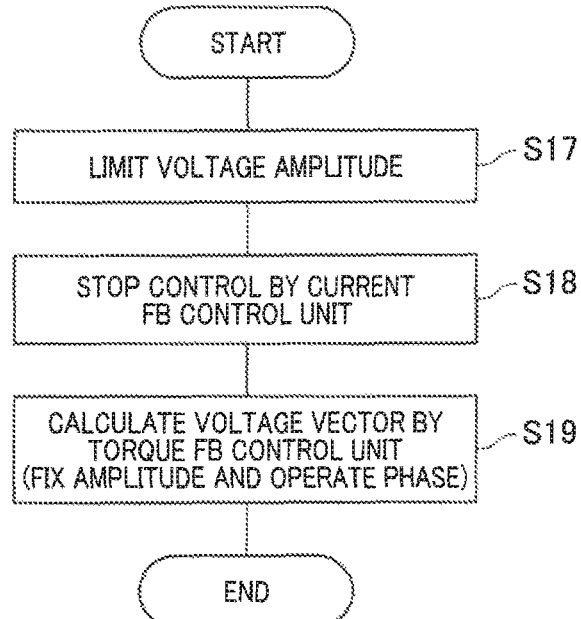
FIG. 9 is a flowchart of voltage vector control during the voltage amplitude limiting process.
Figure 10:
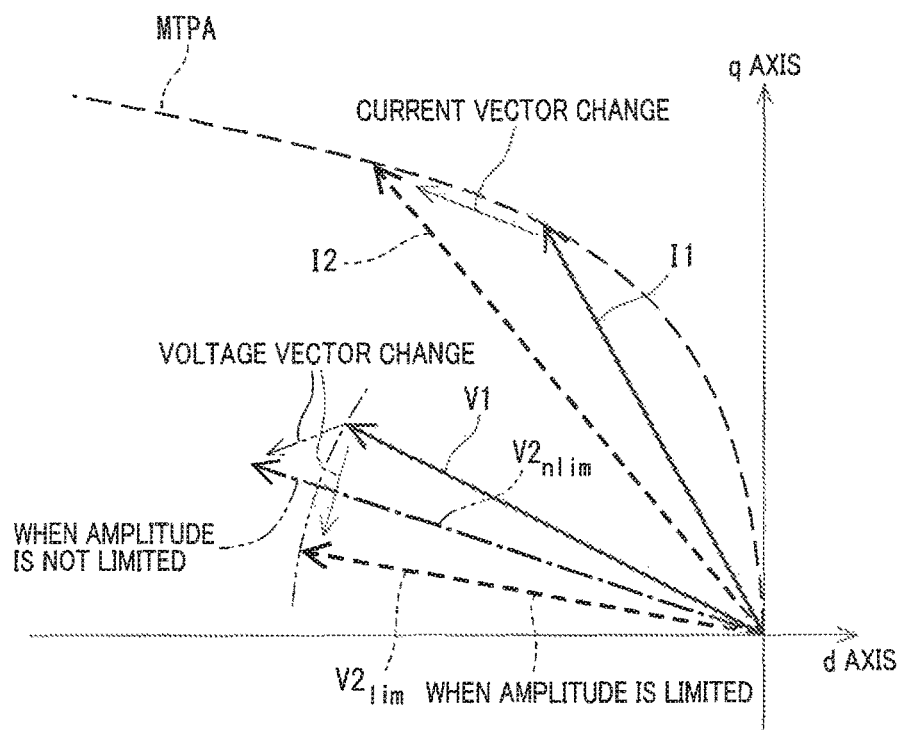
FIG. 10 is a dq-axis vector diagram illustrating the voltage vector control in FIG. 9.

Next, reference is made to the flowchart of FIG. 9 and the dq-axis vector diagram of FIG. 10 for the voltage vector control performed when the voltage amplitude limiting processing is performed.

When it is determined to perform the voltage amplitude limiting process in S17 of FIG. 9, the inverter control unit 50 stops the control by the current feedback control unit 580 in S18, and calculates the voltage vector by the torque feedback control unit 540 in S19. That is, the amplitude Vr is fixed and the phase φ is operated.

In FIG. 10, a current vector I1 and a voltage vector V1 in a first state where target torque is relatively low are indicated by solid arrows, and a current vector I2 in a second state where target torque is relatively high and a voltage vector $V2_{lim}$ obtained when the voltage amplitude is limited and corresponding to the current vector I2 are indicated by dash line arrows. In addition, a voltage vector $V2_{nlim}$ obtained when the voltage amplitude is not limited and corresponding to the current vector I2 is indicated by an alternate long and short dash line arrow. Here, the limit value of the voltage amplitude is assumed to be equal to the amplitude of the voltage vector V1. An MTPA line indicated by a long broken line is a characteristic line of maximum torque control per current.

When the target torque shifts from the first state to the second state, as the amplitude of the current vector increases along the MTPA line, phase of the current vector advances (I1→I2). In addition, when the voltage amplitude is not limited, the voltage amplitude increases due to current feedback control. Therefore, as the amplitude Vr of the voltage vector increases, the phase φ of the voltage vector advances (V1→ $V2_{nlim}$).

In contrast, in a case where the voltage amplitude is limited to be equal to or smaller than the amplitude of the voltage vector V1, the control by the current feedback control unit 580 is stopped and the torque feedback control unit 540 calculates the voltage vector. As a result, only the phase φ of the voltage vector is advanced (V1→ $V2_{lim}$) while the amplitude Vr of the voltage vector is constant.

If the current feedback control is continued when the voltage amplitude is not limited, the voltage amplitude calculated in the current feedback control when the limitation is released significantly deviates from the actual voltage amplitude, and the control may become unstable. Therefore, when the voltage amplitude is limited, by stopping the control by the current feedback control unit 580, it is possible to prevent the control from becoming unstable when the limitation is released.

Second and Third Embodiments

The second and third embodiments will be described with reference to FIGS. 11 to 13. Both the second embodiment and the third embodiment control transient characteristics when voltage amplitude is limited or when the limitation is released according to the first embodiment. Since technical ideas of the two embodiments are related to each other, and drawings used for describing the embodiments are almost common, the embodiments will be described together. In addition, the control performed when the limitation is released will be described here as an example, but the control performed when the voltage amplitude is limited can also be performed in a similar way.

Figure 11A:
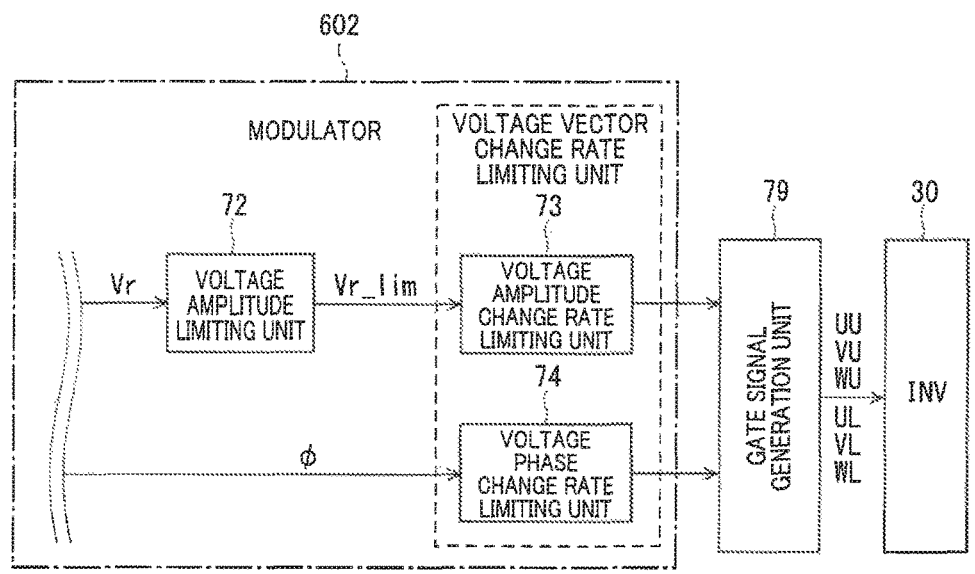
FIGS. 11A and 11B are control block diagrams illustrating configurations of limiting/smoothing a voltage vector (amplitude/phase) change rate according to the second and third embodiments.
Figure 11B:
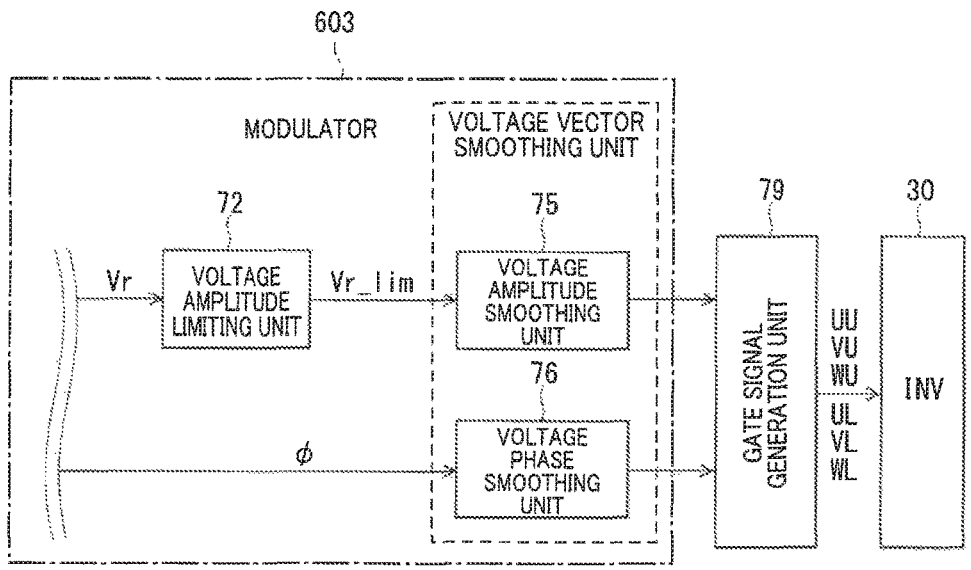

Configurations of modulators 602 and 603 of the second and third embodiments are illustrated in FIGS. 11A and 11B. Portions not illustrated are similar to the portions illustrated in FIG. 4 of the first embodiment.

The modulator 602 of the second embodiment has a voltage amplitude change rate limiting unit 73 that limits a time change rate of voltage amplitude Vr obtained when the limitation is released after the limitation of the voltage amplitude limiting unit 72. The modulator 602 also has a voltage phase change rate limiting unit 74 that limits a time change rate of a voltage phase φ. The modulator 602 may have either one or both of the voltage amplitude change rate limiting unit 73 and the voltage phase change rate limiting unit 74. In a case where the modulator 602 has both of the voltage amplitude change rate limiting unit 73 and the voltage phase change rate limiting unit 74, they may be collectively considered as a voltage vector change rate limiting unit as indicated by a broken line.

The modulator 603 of the third embodiment has a voltage amplitude smoothing unit 75 that smoothes a change in the voltage amplitude Vr caused when the limitation is released after the limitation of the voltage amplitude limiting unit 72. The modulator 603 also has a voltage phase smoothing unit 76 that smoothes a change in a voltage phase φ. The modulator 603 may have either one or both of the voltage amplitude smoothing unit 75 and the voltage phase smoothing unit 76. In a case where the modulator 603 has both of the voltage amplitude smoothing unit 75 and the voltage phase smoothing unit 76, they may be collectively considered as a voltage vector smoothing unit as indicated by a broken line.

Figure 12A:
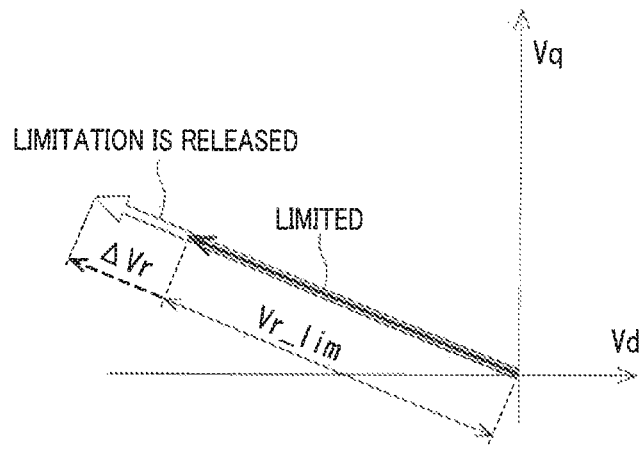
FIGS. 12A and 12B are dq-axis vector diagrams illustrating voltage vector change rate limiting/smoothing processes.
Figure 12B:
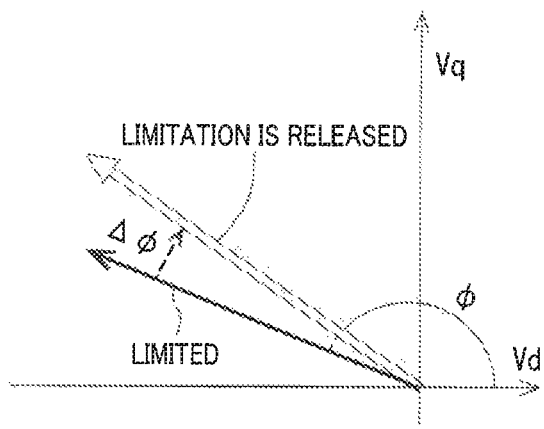

FIGS. 12A and 12B illustrate an example of change in a voltage vector caused when the limitation is released.

When the limitation of voltage amplitude by the voltage amplitude limiting unit 72 is released, (a) amplitude of the voltage vector changes by ΔVr from voltage amplitude Vr_lim obtained when the voltage amplitude is limited, and (b) a phase of the voltage vector changes by Δϕ. Here, a change rate is limited in the second embodiment and the change is smoothed in the third embodiment, in order to prevent the voltage vector from suddenly changing and the control from becoming unstable.

FIGS. 13A to 13D illustrate transient characteristics of the voltage amplitude Vr or a phase ϕ according to the second and third embodiments. When the limitation of the voltage amplitude is released at time tc, in a case where the control of the second and third embodiments is not performed, the voltage amplitude Vr or the phase ϕ changes stepwise as indicated by a two-dot chain line.

Figures 13A, 13B, 13C, 13D:
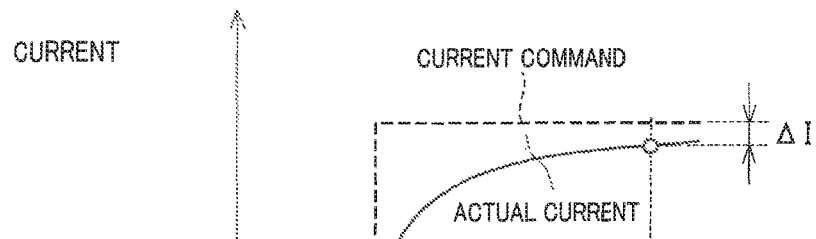
FIGS. 13A to 13D are time diagrams illustrating the voltage vector change rate limiting/smoothing processes.

In contrast, as illustrated in FIG. 13C, an amplitude change rate (dVr/dt) or a phase change rate (dϕ/dt) is limited in the second embodiment. In addition, as illustrated in FIG. 13D, a response to a command is smoothed in the third embodiment. For example, so-called "smoothing processing" is performed by a first-order lag filter having a predetermined time constant.

As illustrated in FIGS. 13A and 13B, execution periods of the change rate limiting process and the smoothing process can be set by, for example, turning on an execution flag in a time period from the time tc to time te in which the difference ΔI between a current command and an actual current after release of the limitation exceeds a predetermined value.

As described above, in the second and third embodiments, it is possible to prevent a voltage vector from suddenly changing when voltage amplitude is limited or when the limitation is released and the control from becoming unstable.

Fourth Embodiment

Figure 14:
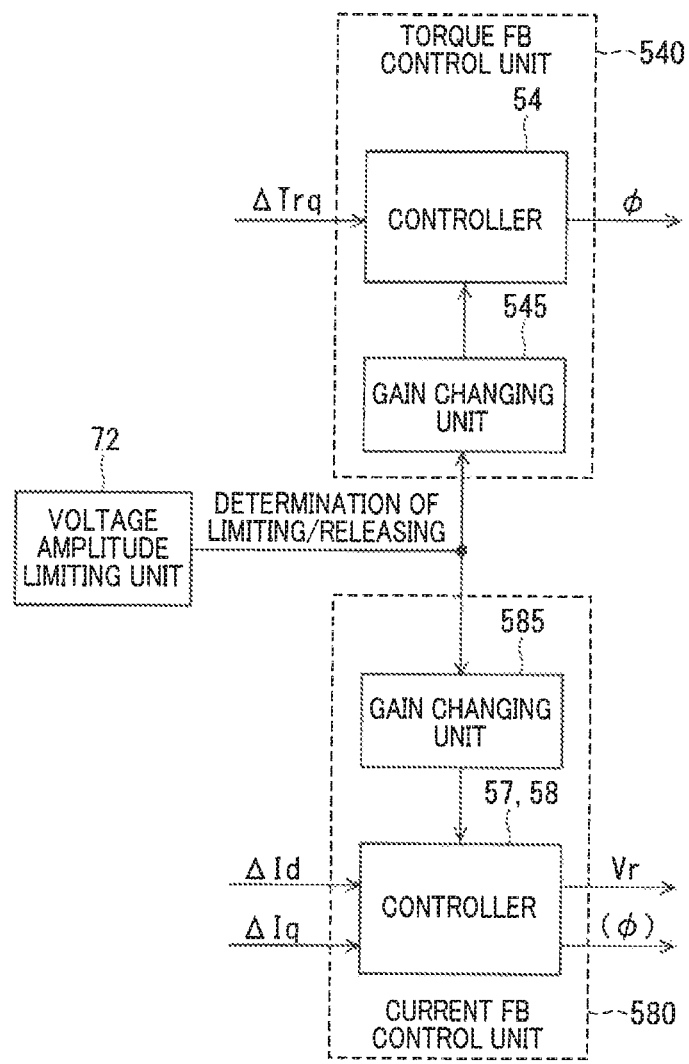
FIG. 14 is a control block diagram illustrating a configuration of PI gain selection according to the fourth embodiment.

The fourth embodiment will be described with reference to FIG. 14. In the fourth embodiment, a gain of the feedback control performed when voltage amplitude is limited or when the limitation is released according to the first embodiment is changed. As a configuration for changing the gain, there are provided a gain changing unit 545 that changes a gain of the controller 54 in the torque feedback control unit 540, and a gain changing unit 585 that changes gains of the controllers 57 and 58 in the current feedback control unit 580. Typically, the gain means a proportional gain and an integral gain in PI control.

In a case where a signal that determines limiting or releasing the limitation is input from a voltage amplitude limiting unit 72, the gain changing units 545 and 585 change a gain of at least one of torque feedback and current feedback so as to be lower than usual over a predetermined time period. Accordingly, in the fourth embodiment, it is possible to prevent a voltage vector from suddenly changing when voltage amplitude is limited or when the limitation is released and the control from becoming unstable.

Fifth Embodiment

Figure 15:
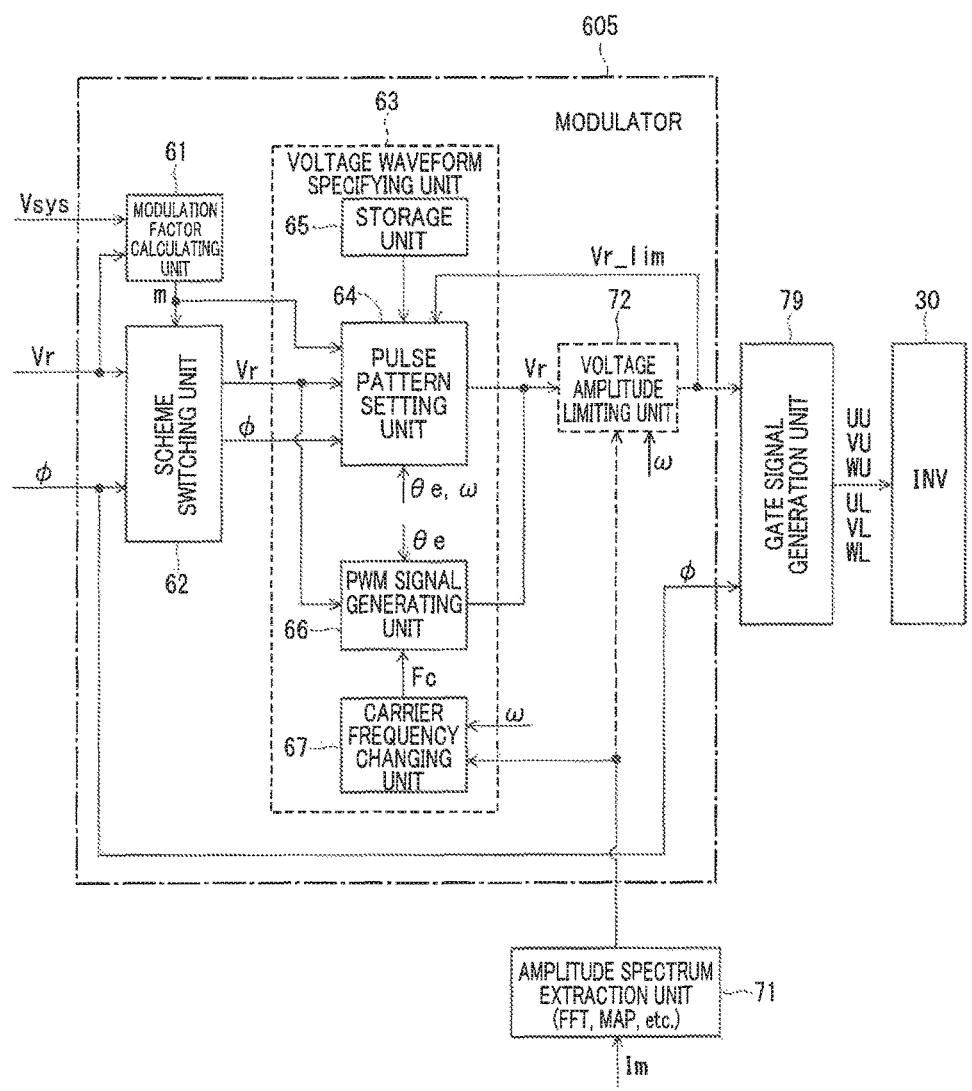
FIG. 15 is a control block diagram of a modulator of the fifth embodiment.

The fifth embodiment will be described with reference to FIGS. 15 to 17. FIG. 15 is a block diagram of the modulator corresponding to FIG. 4. FIG. 17 is a flowchart corresponding to FIG. 8.

An MG control apparatus of the fifth embodiment is configured based on a premise that the current feedback control unit 580 generates a voltage vector by PWM control. For example, the torque feedback control unit 540 illustrated in FIG. 3 may not be provided. Alternatively, in a configuration including the torque feedback control unit 540 and the current feedback control unit 580, the control focusing only on operation in the PWM control by the current feedback control unit 580 may be defined as the fifth embodiment.

As illustrated in FIG. 15, in a modulator 605 of the fifth embodiment, information that an amplitude spectrum of a specific frequency of the bus current Im is equal to or larger than a determination threshold is notified from the amplitude spectrum extraction unit 71 to the carrier frequency changing unit 67. The carrier frequency changing unit 67 changes a carrier frequency Fc of the PWM control based on the information on the rotation number ω and the amplitude spectrum.

In FIG. 15, a block of the voltage amplitude limiting unit 72 and a signal line from the amplitude spectrum extraction unit 71 to the voltage amplitude limiting unit 72 are indicated by broken lines. This means that the voltage amplitude limiting process by the voltage amplitude limiting unit 72 may be performed together.

Figure 16A:
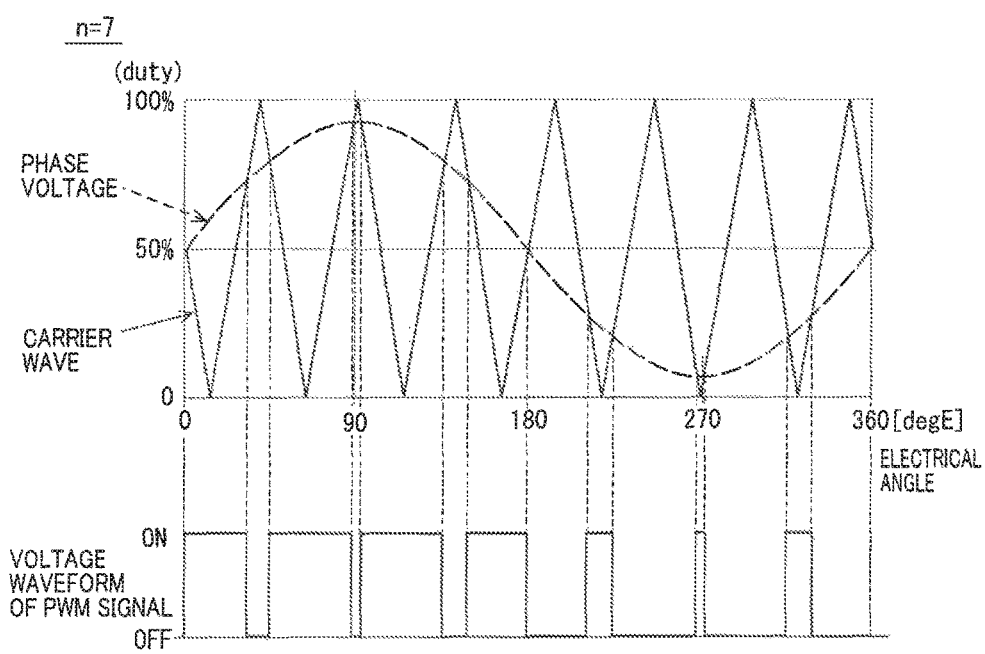
FIGS. 16A and 16B are diagrams illustrating change of a voltage waveform in accordance with change of a carrier frequency.
Figure 16B:
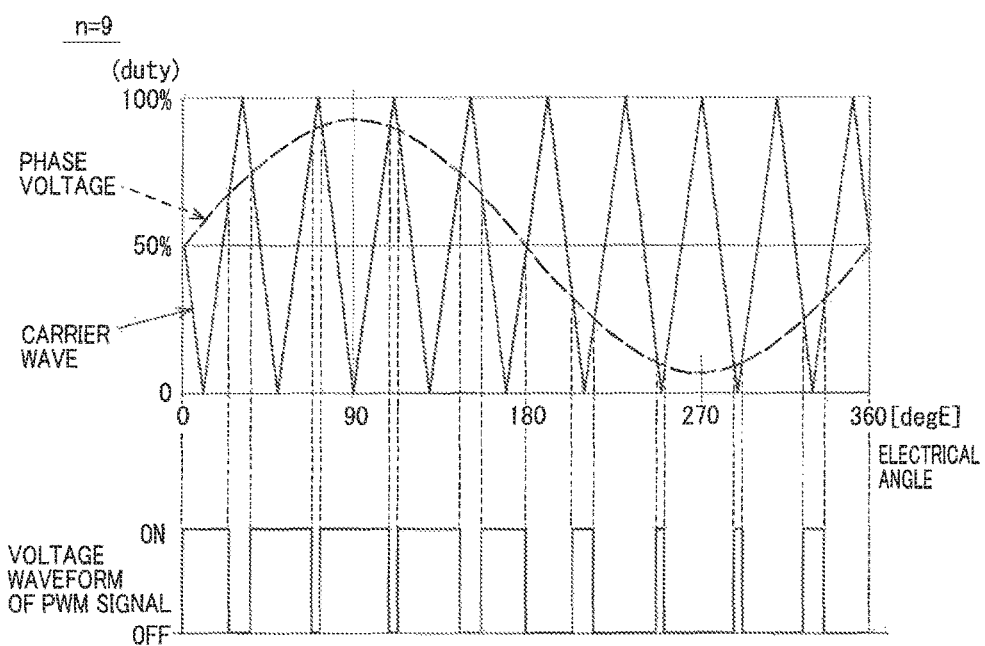

Regarding significance of changing the carrier frequency, refer to FIGS. 16A and 16B. FIGS. 16A and 16B illustrate voltage waveforms of a PWM signal in a case where the number n of a carrier period of one cycle of electricity is n=7 in FIG. 16A and n=9 in FIG. 16B. In a case where the carrier frequency Fc is changed in this manner, since the number of pulses of the voltage waveform and a phase of a pulse edge change, the amplitude spectrum of the bus current Im changes accordingly. Therefore, similarly to the first embodiment in which a voltage waveform is changed by limiting the voltage amplitude Vr, an effect of lowering the amplitude spectrum of the specific frequency below the determination threshold is provided. In this case, the carrier frequency Fc may be changed to be higher or lower.

FIG. 17 is a flowchart of the carrier frequency changing process according to the fifth embodiment.

In S21, the voltage vector is calculated by calculating the voltage amplitude Vr by the current feedback control. In S22, the carrier frequency Fc is specified.

S23 to S26 are substantially the same as S13 to S16 in FIG. 8. In S27, the carrier frequency changing unit 67 changes the carrier frequency Fc. The present process then returns to S23, in which the voltage waveform is specified again by the PWM control, and S24 to S26 are repeated.

As described above, in an MG control apparatus 105 of the fifth embodiment, when a specific frequency of the amplitude spectrum of the bus current Im of the inverter 30 matches a resonance frequency of the circuit and the amplitude spectrum of the specific frequency is equal to or larger than the determination threshold, the carrier frequency changing unit 67 changes the carrier frequency Fc. This makes it so possible to, as in the first embodiment, appropriately suppress noise and vibration of the system.

Sixth Embodiment

The sixth embodiment will be described with reference to FIG. 18. The sixth embodiment can be combined with any of the first to fourth embodiments in which voltage amplitude is limited and the fifth embodiment in which a carrier frequency is changed. In the sixth embodiment, after limiting the voltage amplitude or changing the carrier frequency, re-limiting or re-changing is prohibited for a predetermined time period.

Figure 18:
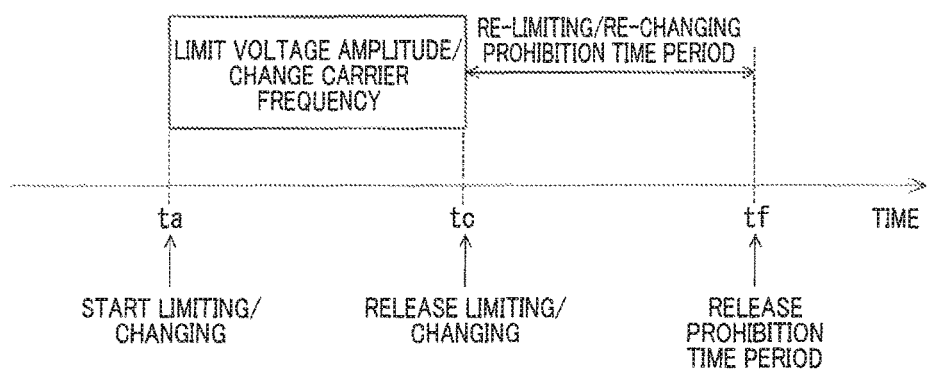
FIG. 18 is a time chart illustrating a re-limiting/re-changing prohibition period according to the sixth embodiment.

At time ta in FIG. 18, limiting voltage amplitude or changing a carrier frequency is started, and is released at time tc. At this time, re-limiting the voltage amplitude and re-changing the carrier frequency are prohibited from time tc to time tf when a predetermined re-limiting/re-changing prohibition period elapses. This makes it possible to limit frequent change of the voltage waveform and to prevent control from becoming unstable.

Seventh Embodiment

Next, an MG control apparatus of the seventh embodiment will be described with reference to FIGS. 19 and 20.

Figure 19:
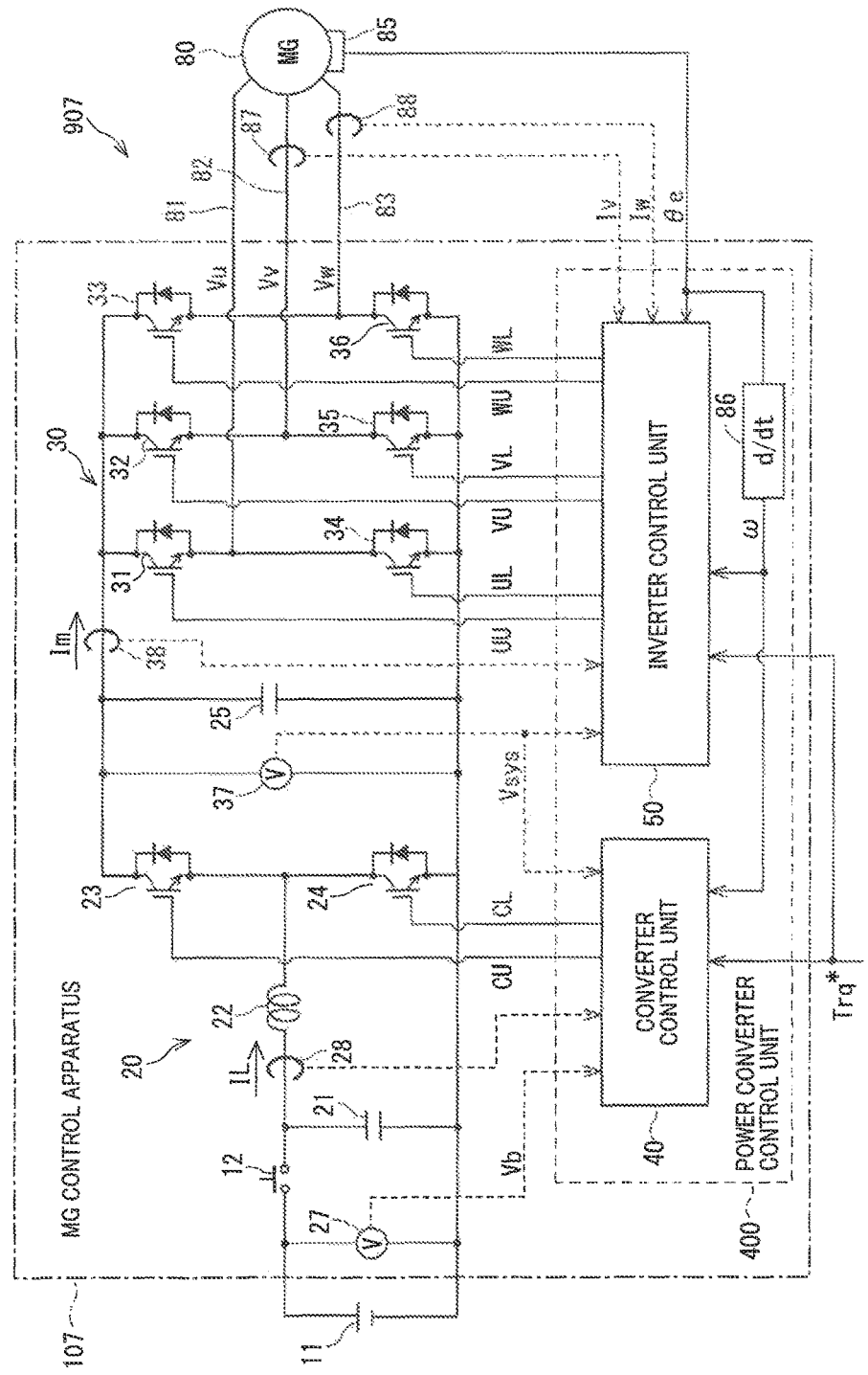
FIG. 19 is a schematic configuration diagram of an MG drive system to which a control apparatus for an AC motor of the seventh embodiment is applied.

As illustrated in FIG. 19, an MG control apparatus 107 is applied to an MG drive system 907 including the converter 20, and includes the converter 20 and the converter control unit 40 in addition to the inverter 30 and the inverter control unit 50. The converter control unit 40 and the inverter control unit 50 are collectively referred to as a power converter control unit 400.

In the following description, boosting operation of the converter during power running operation of the MG 80 will be mentioned.

The converter 20 includes a filter capacitor 21, a reactor 22, a high-potential side switching element 23, a low-potential side switching element 24, and the like.

The filter capacitor 21 is provided at an input portion of the converter 20 and removes power supply noise from the battery 11. One end of the reactor 22 is connected to the battery 11, and the other end is connected to a connection point between the high-potential side switching element 23 and the low-potential side switching element 24. In the reactor 22, an induced voltage is generated in accordance with change of the current, and electric energy is accumulated.

The high-potential side switching element 23 and the low-potential side switching element 24 are connected in series between a bus of the inverter 30 and a low-potential electrode of the battery 11. The high-potential side switching element 23 and the low-potential side switching element 24 are turned on and off complementarily by gate signals CU and CL commanded by the converter control unit 40.

When the high-potential side switching element 23 is off and the low-potential side switching element 24 is on, a reactor current IL flows to the reactor 22, whereby energy is accumulated.

In a case where the high-potential side switching element 23 is on and the low-potential side switching element 24 is off, the energy accumulated in the reactor 22 is released, whereby the smoothing capacitor 25 is charged with a system voltage Vsys obtained by boosting a battery voltage Vb.

A voltage sensor 27 detects the battery voltage Vb. A current sensor 28 detects the reactor current IL.

In addition, the relay 12 capable of shutting off power supply from the battery 11 is provided at the input portion of the converter 20. The relay 12 is an element that generates resonance in a circuit including the battery 11, the inverter 30, and the MG 80. Therefore, as in the first embodiment, in a case where a specific frequency of an amplitude spectrum of a bus current Im of the inverter 30 matches a resonance frequency of the relay 12 or the like of the circuit, vibration and noise due to resonance may increase.

The converter control unit 40 obtains information such as the battery voltage Vb detected by the voltage sensor 27, the reactor current IL detected by the current sensor 28, the system voltage Vsys input to the inverter 30, and the like. The converter control unit 40 then calculates a voltage command value for the system voltage Vsys based on a torque command Trq* and the rotation number ω of the MG 80.

In a case where the voltage command value calculated by the converter control unit 40 based on a system request is higher than the battery voltage Vb, the MG control apparatus is in a "boosting state" in which the battery voltage Vb is required to be boosted. At this time, the converter control unit 40 generates the gate signals CU and CL so as to boost the battery voltage Vb to a desired voltage command value, and turns on the high-potential side switching element 23 and the low-potential side switching element 24 alternately.

On the other hand, in a case where the voltage command value calculated by the converter control unit 40 based on a system request is equal to or lower than the battery voltage Vb, the MG control apparatus is in a "non-boosting state" in which boost is not requested. At this time, the converter control unit 40 outputs the battery voltage Vb to the inverter 30 without boosting. In the non-boosting state, a state in which the high-potential side switching element 23 is on and the low-potential side switching element 24 is off is continued.

Regarding boosting control of the converter 20, Japanese Patent Application Laid-open No. 2014-158328 discloses a technique of current mode control for controlling a boosted voltage based on a detected value of a reactor current IL, for example. By adopting this current mode control system or the like, the converter control unit 40 can stabilize the system voltage Vsys output to the inverter 30 at the time of boosting.

In the boosting state, the MG control apparatus 107 outputs the system voltage Vsys stabilized by the converter control unit 40 using current mode control or the like to the inverter 30. This makes it possible to suppress vibration and noise due to resonance even in a case where the specific frequency of the amplitude spectrum of the bus current Im matches the resonance frequency of the circuit.

On the other hand, in the non-boosting state in which this effect cannot be provided, resonance needs to be suppressed by performing, in the inverter control unit 50, the voltage amplitude reduction process according to the first embodiment and the carrier frequency changing process according to the fifth embodiment, and changing the output voltage waveform of the inverter 30.

Figure 20:
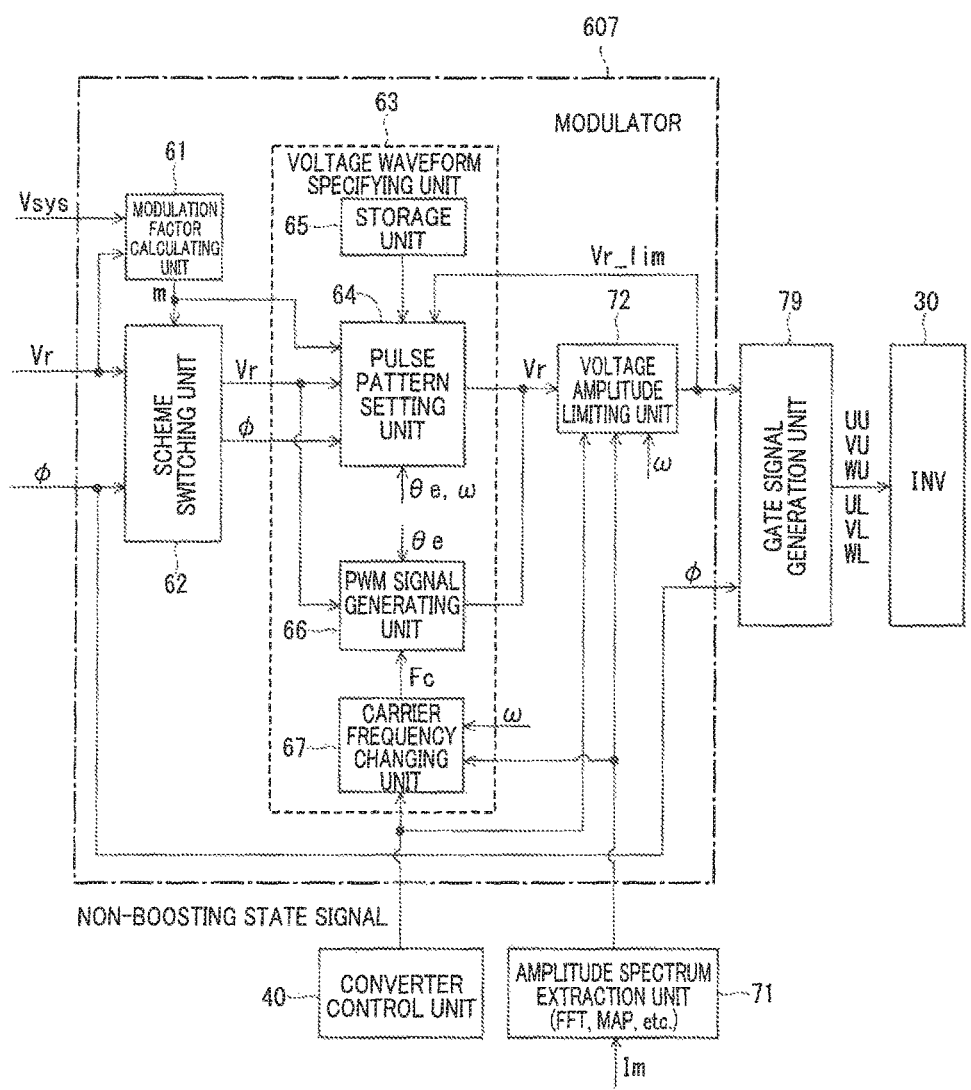
FIG. 20 is a control block diagram of a modulator of the seventh embodiment.

Therefore, as illustrated in FIG. 20, in a modulator 607 of the seventh embodiment, in addition to the configurations of the modulators 601 and 605 of the first and fifth embodiments, a signal indicating that the converter 20 is in the non-boosting state is input from the converter control unit 40. The voltage amplitude limiting unit 72 and the carrier frequency changing unit 67 perform the voltage amplitude reduction process and the carrier frequency changing process only when a non-boosting state signal is input.

As described above, in the seventh embodiment, the converter control unit 40 and the inverter control unit 50 cooperate with each other so that the control of resonance suppression can be appropriately switched in accordance with a situation.

Other Embodiments (a) In the above embodiments, attention is paid to the resonance frequency of the relay 12 as the resonance frequency of the "circuit including the battery 11, the inverter 30, and the MG 80", but attention may also be paid to the resonance frequency by the capacitor 25, the motor windings 81 to 83, and the like, in addition to the relay 12.

For example, in the seventh embodiment including the converter 20, a specific frequency of the amplitude spectrum of the bus current Im may be set by paying attention to the resonance frequency of LC resonance by the reactor 22 and the smoothing capacitor 25.

(b) In the above embodiments assuming the control apparatus of the three-phase AC motor, a spectrum of the electric sixth-order component, the 12th-order component, the 18th-order component, and the like tend to appear large as the amplitude spectrum of the bus current Im.

It should be noted that the number of phases of a multi-phase AC motor driven in a system to which the present invention is applied may be four or more. In addition, the motor is not limited to a permanent magnet synchronous motor, but may be an induction motor or another synchronous motor. Depending on characteristics of such electric motors and the like, an order component appearing large in the amplitude spectrum of the bus current Im differs from time to time.

(c) The inverter control unit may calculate the voltage vector not only by the feedback control, but also by feedforward control.

(d) The control apparatus for the AC motor according to the present invention may be applied not only to the MG drive system of a hybrid vehicle or an electric vehicle but also to a drive system of an AC motor for any purpose, such as for general machines.

It will be appreciated that the present invention is not limited to the configurations described above, but any and all modifications, variations or equivalents, which may occur to those who are skilled in the art, should be considered to fall within the scope of the present invention.

Hereinafter, an aspect of the above-described embodiments will be summarized.

As a first aspect of the embodiment, a control apparatus for an AC motor (80) includes an inverter (30), a voltage command calculation unit (540, 580), a voltage waveform specifying unit (63), an amplitude spectrum extraction unit (71), and a voltage amplitude limiting unit (72).

The inverter converts DC power received from a power supply (11) to AC power by operations of a plurality of switching elements (31 to 36) to supply the AC power to the AC motor (80).

The voltage command calculation unit calculates a voltage vector used for giving a command to the inverter.

The voltage waveform specifying unit specifies, as a voltage waveform for operating the inverter based on the voltage vector calculated by the voltage command calculation unit, "a pulse pattern selected from a plurality of previously stored voltage waveforms depending on a predetermined condition", or a voltage waveform of "a PWM signal generated by a comparison between a phase voltage and a carrier wave".

The amplitude spectrum extraction unit obtains a bus current (Im) of the inverter to extract an amplitude spectrum of a specific frequency corresponding to a resonance frequency of a circuit through which the bus current flows.

The voltage amplitude limiting unit limits an amplitude of the voltage vector so that the amplitude spectrum of the specific frequency becomes less than a determination threshold, if the amplitude spectrum of the specific frequency correlating with the voltage waveform is the determination threshold or more.

Specifically, the voltage command calculation unit includes a current feedback control unit (580) that calculates an amplitude of the voltage vector as an operation amount for feedback-controlling a current flowing through the AC motor. In addition, the voltage command calculation unit may further include a torque feedback control unit (540) that calculates a phase of the voltage vector as an operation amount for feedback-controlling torque of the AC motor.

According to the first aspect of the embodiment, when the specific frequency of the amplitude spectrum of the bus current of the inverter matches the resonance frequency of the circuit and the amplitude spectrum of the specific frequency is equal to or larger than the determination threshold, the voltage amplitude limiting unit limits the amplitude of the voltage vector. This makes it possible to appropriately suppress noise and vibration of the system.

As a second aspect of the embodiment, a control apparatus for an AC motor includes, in addition to an inverter (30) and an amplitude spectrum extraction unit (71) similar to those of the first aspect, a current feedback control unit (580), a PWM signal generating unit (66), and a carrier frequency changing unit (67).

The current feedback control unit and the PWM signal generating unit are respectively correspond to parts of the configurations included in the voltage command calculation unit and the voltage waveform specifying unit of the first aspect.

The current feedback control unit calculates an amplitude of a voltage vector used for giving a command to the inverter as an operation amount for feedback-controlling a current flowing through the AC motor.

The PWM signal generating unit specifies, as a voltage waveform for operating the inverter based on the voltage vector calculated by the voltage command calculation unit, a voltage waveform of "a PWM signal generated by a comparison between a carrier wave and a phase voltage calculated based on an output of the current feedback control unit".

The carrier frequency changing unit changes a carrier frequency used for generating the PWM signal so that the amplitude spectrum of the specific frequency becomes less than a determination threshold, if the amplitude spectrum of the specific frequency correlating with the voltage waveform is the determination threshold or more.

According to the second aspect of the embodiment, when a specific frequency of the spectrum of the bus current of the inverter matches a resonance frequency of the circuit and the amplitude spectrum of the specific frequency is equal to or larger than the determination threshold, the carrier frequency changing unit changes the carrier frequency. This makes it possible to, as in the first aspect, appropriately suppress noise and vibration of the system.

What is claimed is:

1. A control apparatus for an AC motor, the apparatus comprising:
   an inverter that converts DC power received from a power supply to AC power by operations of a plurality of switching elements to supply the AC power to the AC motor;
   a voltage command calculation unit that calculates a voltage vector used for giving a command to the inverter;
   a voltage waveform specifying unit that specifies, as a voltage waveform for operating the inverter based on the voltage vector calculated by the voltage command calculation unit, a pulse pattern selected from a plurality of previously stored voltage waveforms depending on a predetermined condition, or a voltage waveform of a PWM signal generated by a comparison between a phase voltage and a carrier wave;

an amplitude spectrum extraction unit that obtains a bus current of the inverter to extract an amplitude spectrum of a specific frequency corresponding to a resonance frequency of a circuit through which the bus current flows; and a voltage amplitude limiting unit that limits an amplitude of the voltage vector so that the amplitude spectrum of the specific frequency becomes less than a determination threshold, if the amplitude spectrum of the specific frequency correlating with the voltage waveform is the determination threshold or more.

2. The control apparatus for an AC motor according to claim 1, wherein
the voltage command calculation unit includes a current feedback control unit that calculates the voltage vector as an operation amount for feedback-controlling a current flowing through the AC motor, and
the voltage waveform specifying unit includes at least one of a pulse pattern setting unit that selects a pulse pattern from a plurality of previously stored pulse patterns based on a modulation factor calculated from a voltage amplitude and an inverter voltage output from the current feedback control unit and the rotation number of the AC motor, and a PWM signal generating unit that generates a PWM signal by a comparison between the carrier wave and the phase voltage calculated based on an output of the current feedback control unit.

3. The control apparatus for an AC motor according to claim 2, wherein
the voltage command calculation unit further includes a torque feedback control unit that calculates a phase of the voltage vector as an operation amount for feedback-controlling torque of the AC motor,
the voltage waveform specifying unit has the pulse pattern setting unit, and
when the torque feedback control unit calculates the voltage vector, the pulse pattern setting unit selects a pattern outputting a rectangular wave having one pulse per one electrical cycle.

4. The control apparatus for an AC motor according to claim 3, wherein
when the voltage amplitude limiting unit limits the amplitude of the voltage vector, the voltage command calculation unit stops control of the current feedback control unit, and the torque feedback control unit calculates the voltage vector.

5. The control apparatus for an AC motor according to claim 3, wherein
when the voltage waveform specified by the voltage waveform specifying unit becomes a rectangular wave, the voltage command calculation unit stops control of the current feedback control unit, and the torque feedback control unit calculates the voltage vector.

6. The control apparatus for an AC motor according to claim 1, wherein
the control apparatus is applied to an AC motor drive system including a converter that boosts a voltage of the power supply and outputs the boosted voltage to the inverter, and
if the converter is in a non-boosting state, the voltage amplitude limiting unit limits the voltage vector.

7. A control apparatus for an AC motor, comprising:
an inverter that converts DC power received from a power supply to AC power by operations of a plurality of switching elements to supply the AC power to the AC motor;
a current feedback control unit that calculates a voltage vector used for giving a command to the inverter as an operation amount for feedback-controlling a current flowing through the AC motor;
a PWM signal generating unit that specifies, as a voltage waveform for operating the inverter based on the voltage vector calculated by the voltage command calculation unit, a voltage waveform of a PWM signal generated by a comparison between a carrier wave and a phase voltage calculated based on an output of the current feedback control unit;
an amplitude spectrum extraction unit that obtains a bus current of the inverter to extract an amplitude spectrum of a specific frequency corresponding to a resonance frequency of a circuit through which the bus current flows; and
a carrier frequency changing unit that changes a carrier frequency used for generating the PWM signal so that the amplitude spectrum of the specific frequency becomes less than a determination threshold, if the amplitude spectrum of the specific frequency correlating with the voltage waveform is the determination threshold or more.

8. The control apparatus for an AC motor according to claim 7, wherein
the control apparatus is applied to an AC motor drive system including a converter that boosts a voltage of the power supply and outputs the boosted voltage to the inverter, and
if the converter is in a non-boosting state, the carrier frequency changing unit changes the carrier frequency.

* * * * *